Feb. 7, 1928.
F. P. PRINDLE
1,658,058
JAR FOR FRUIT AND OTHER PURPOSES
Filed Feb. 1, 1922
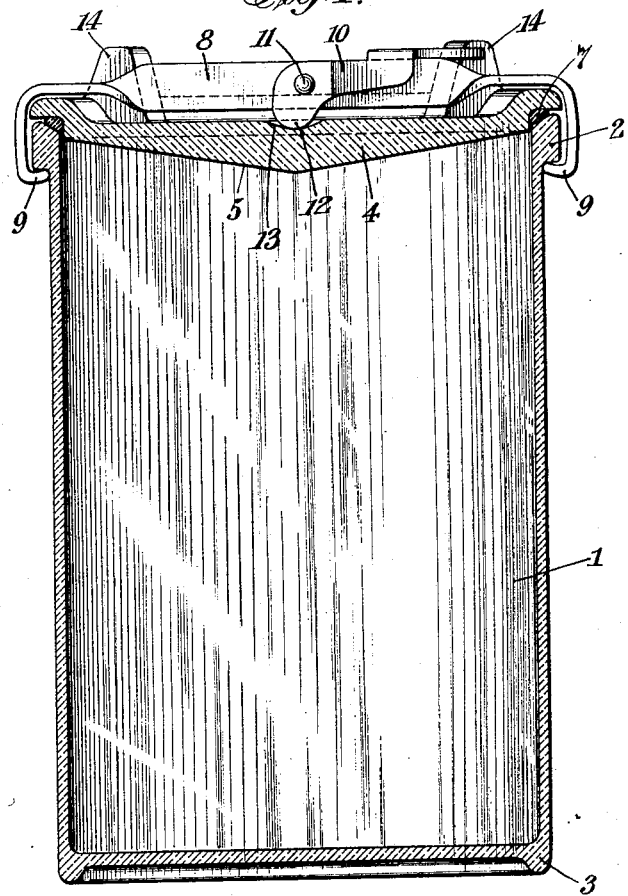
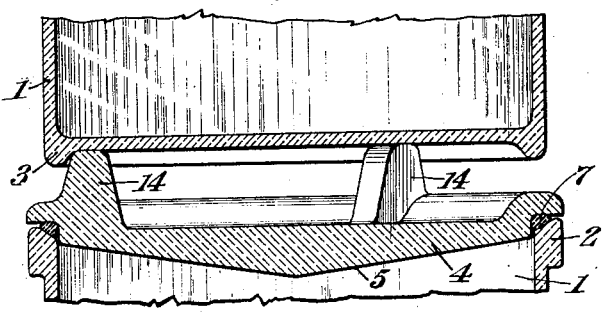
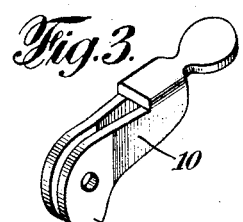
INVENTOR
Frank P. Prindle
BY his ATTORNEYS
Prindle, Wright, & Small Patented Feb. 7, 1928.

1,658,058

UNITED STATES PATENT OFFICE.

FRANK P. PRINDLE, OF NEW BRITAIN, CONNECTICUT.

JAR FOR FRUIT AND OTHER PURPOSES.

Application filed February 1, 1922. Serial No. 533,143.

This invention relates to improvements in jars for fruits and for other purposes.

This invention has as an object the provision of a jar which may be used for preserving fruits by either a hot or a cold process of hermetic sealing. It has as a further object the provision of means for forcing out substantially all of the air from the jar when sealing it, and means for securely affixing the cover to the jar. A further object of the invention is to provide improved means for clamping the cover to the jar without danger of breaking the jar at a weak point, and also without involving any risk of allowing air to enter the jar after clamping on the cover. A still further object of the invention is to provide means on the jars or covers whereby they may be stacked on top of each other in a secure manner without contacting with the clamping means.

These objects are accomplished by the device of the present invention, and the following description constitutes a preferred embodiment thereof. This preferred embodiment is illustrated in the accompanying drawing, which forms part of the specification, and in which Figure 1 illustrates a jar having a cover clamped thereto;

Fig. 2 shows the method of stacking the jars, and

Fig. 3 shows in perspective a cam-lever used in clamping the cover to the jar.

In said drawing, there is shown a jar 1 which may be used for fruit or for other substances, which jar is provided with an annular enlargement 2 at its upper periphery, and an annular depending portion 3 at its lower periphery. A cover 4 of conical cross section on its under side, as shown at 5, serves to close the jar, and this cover has a substantially right-angled recess of annular form for the purpose of accommodating a round annular gasket 7. The upper edge of the jar is bevelled so as to provide an annular pocket to receive said gasket. A clamping bar 8 having hooks 9 is mounted above the cover and has secured thereto a cam-lever 10 by means of a pivot or journal 11. This cam-lever 10 has a cam portion 12 which engages a recess 13 on the top of the cover when in locking engagement. The bar 8 is yieldable so that when the cam-lever is pushed down a tight engagement between the cover and the jar will be made possible. Lugs 14 are provided preferably on the cover for the purpose of permitting the jars to be stacked, one above the other, and it will be noted that the lugs are sufficiently high so that there will be no contact with the clamping means. The jars are prevented from slipping off from the lugs 14 by the annular enlargements 3 formed at the bottoms of the jars.

The clamping bar 8 is shown with two twists in it for the purpose of giving it rigidity in the vicinity of the pivot 11 and the clamp 10, and also for imparting to the ends thereof a certain amount of resiliency so that the hooks 9 will engage the shoulders with sufficient clamping pressures.

The manner in which such a jar is used will be apparent from the above description, and it will be sufficient to say that when the jar is filled with fruit or other material the cover is placed upon the jar with the gasket in proper position and with the hooks 9 touching beneath the enlargement 2. The cam-lever 10 is then swung over and clamped down upon the bar 8, thus locking the cover securely and firmly in place so as to provide a hermetic seal for the jar. It is to be noted that the gasket is not flat in form, and this is an advantage since the compression of the round gasket used in the present invention causes a distortion thereof whereby all crevices or irregularities are filled and entry or escape of air is made impossible. The jar may be used for cold canning processes as well as hot canning processes, and it will be evident that in either case the conical form of the cover causes the air to be expelled out towards the sides as the cover is lowered so that when it firmly engages the gasket the air will have escaped from the can, assuming the latter to have been filled with fruit to the proper level. The removal of air is important in preserving the contents of the jar, and this is particularly true in cold canning processes where no heat sterilization is relied upon. The same advantages exist when a process of heat sterilization is performed, and in this event further air may be expelled by boiling or by vacuum processes so that all the air may be removed from the jar and its contents, and the small amount of air remaining as atmosphere above the contents at the top of the jar, will be expelled by the conical surfaces of the cover. The total expulsion of air may therefore be accomplished in such a hot sterilization process, and development of aerobic bacteria will be totally prevented as well as local actions between any oxygen remaining inside the can and the walls of the can when these walls are made of metal or other corrosive material. When canning by a cold canning process it is important and essential that no air be admitted to the can after sealing, and therefore the clamping and sealing means of the present invention are of great value in securing good results.

The enlargement 2 at the top of the jar is for the purpose of strengthening it to prevent breaking of the jar by the hooks 9. The conical form of the cover may of course be altered somewhat, bearing in mind that the purpose is to force the air outwardly when the cover is lowered. The gasket 7 need not be round in cross section since what is desired is to have a gasket that may be compressed to fill crevices and irregularities when the cover is closed down. For this purpose the preferred embodiment shows the rectangular recess in the cover and a bevelled edge on the jar whereby a pocket is provided, but these structures may of course be reversed and they may assume different forms as long as some kind of a pocket is provided within which a gasket may be compressed and distorted in a manner similar to that shown in the preferred embodiment. The lugs are preferably formed on the cover, and, as before stated, enable the jars to be stacked whether such jars are of equal volumes or not. For example, jars of various capacities may be thus stacked provided they be made of substantially the same diameters. Clamping means of various forms may be employed, the prime consideration being that they securely and permanently lock the cover and jar although in hot sterilization processes and in vacuum processes the atmospheric pressure upon the cover will as a rule be sufficient to prevent this easy removal.

As many apparently widely different embodiments of this invention may be made without departing from the spirit thereof, it is to be understood that I do not intend to limit myself to the specific embodiment thereof except as indicated in the appended claims.

I claim:

1. A jar and a cover therefor, both formed at their peripheries to provide when closed a triangular pocket for receiving a gasket, and means for clamping the cover on the jar, said cover sloping upwardly on its under side to provide for expulsion of air.

2. A jar and a cover therefor, the periphery of one being bevelled and the other having a substantially right-angled recess so that when closed they will form a pocket for a gasket, means for clamping the cover on the jar, said cover sloping upwardly on its under side to provide for expulsion of air.

3. A jar having an enlarged periphery provided with a bevelled edge, a cover for the jar having a right-angled annular recess adjacent said bevelled edge, and having a conical under side for forcing out air from the jar, means to clamp the cover on the jar comprising a yieldable bar having depending hooks to catch under the enlargements on the jar, and a cam-lever fulcrumed on the bar.

4. A jar having a bevelled periphery and an enlarged perimeter; a cover for the jar having a right angled recess adjacent said bevelled edge and having its under side sloping upwardly; and a clamping means mounted on the cover having hooks engaging underneath said enlarged perimeter.

5. A jar having a bevelled periphery and an enlarged perimeter; a cover for the jar having a right angled recess adjacent said bevelled edge and having its under side sloping upwardly; a clamping means mounted on the cover having hooks engaging underneath said enlarged perimeter; and projections on the cover extending above the said clamping means so that jars may be stacked one on the other.

In testimony that I claim the foregoing, I have hereunto set my hand, this 26 day of January, 1922.

FRANK P. PRINDLE.